United States Patent Office 2,998,121
Patented Aug. 29, 1961

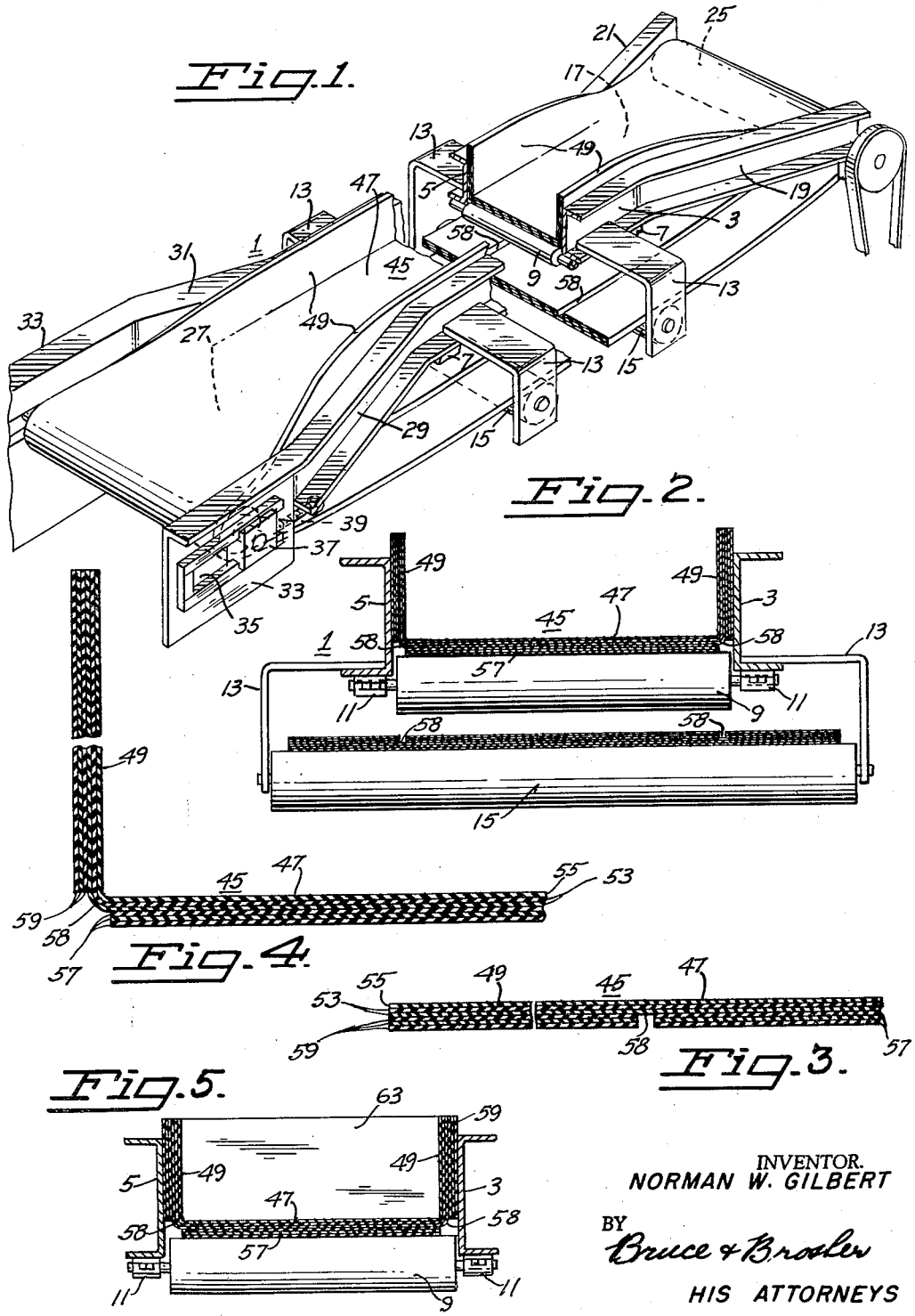

2,998,121
SELF FORMING FLANGE BELT CONVEYOR
ASSEMBLY AND BELTING THEREFOR
Norman W. Gilbert, 719 Cragmont Ave., Berkeley, Calif.
Filed Jan. 7, 1958, Ser. No. 707,600
5 Claims. (Cl. 198—191)

My invention relates to conveyors and more particularly to a belt conveyor assembly and belting therefor.

Belt conveyors are currently employed in the handling of a multitude of products including items in the category of food, such as fruits, vegetables and the like.

In conjunction with the handling or processing of these types of items, sanitation is a factor of primary consideration, along with the ability to handle such items with a minimum of injury thereto.

Conventional practice prior to the present invention, was to run a conveyor belt between a pair of stationary parallel spaced walls, the walls and belt together forming a trough with a transitory bottom, to convey items from one location to another.

Such type of belt assembly construction allowed seepage of juices beneath the side walls, besides causing injury through agitation of the items thereon by frictional engagement with the stationary walls or damage to items on the belt which might accidently get caught or pinned between one of said stationary walls and the proximate surface of the moving belt. For sanitary reasons, the metal components of such conveyor assemblies were for the most part fabricated of stainless steel. The necessary frequent cleaning of such a belt assembly presented additional problems.

Among the objects of my invention are:

(1) To provide a novel and improved conveyor belt assembly;

(2) To provide a novel and improved conveyor belt assembly which minimizes probable injury to the contents being conveyed thereon;

(3) To provide a novel and improved conveyor belt assembly which is more sanitary than prior conveyor belt assembly types;

(4) To provide a novel and improved conveyor belt assembly of simple construction and capable of operating with a high degree of efficiency;

(5) To provide a novel and improved conveyor belt assembly in which the metal parts might be of plain steel;

(6) To provide a novel and improved conveyor belt assembly having a self-forming flange belt, and capable of running on pulleys as small as three inches in diameter, regardless of the size of flange formed;

(7) To provide novel and improved belting for a conveyor belt assembly;

(8) To provide novel and improved belting for a conveyor belt assembly, which makes for sanitary operation of the assembly; and (9) To provide novel and improved belting for a conveyor belt assembly, capable of forming its own flanges during operation and enabling use of small diameter pulleys.

Additional objects of my invention will be brought out in the following description of a preferred embodiment of the same taken in conjunction with the accompanying drawings, wherein:

FIGURE 1 is a three dimensional view of a conveyor assembly incorporating features of the present invention;

FIGURE 2 is a view in section transversely of the conveyor assembly of FIGURE 1;

FIGURE 3 is a view in section transversely of belting employed in the assembly of FIGURE 1, depicting the same in non-load carrying condition;

FIGURE 4 is a view in section transversely of the belt of FIGURE 3, depicting the same in load carrying condition;

FIGURE 5 is a view in section depicting use of a cleat type belt.

Referring to the drawings for details of my invention in its preferred form, the conveyor assembly of the present invention is a self-forming flange belt conveyor assembly and comprises a frame 1 including a pair of parallel spaced opposing flange supporting walls 3 and 5 and cross members 7 connecting said walls to hold them in proper spaced relationship to each other.

At spaced locations along said walls, the walls are provided with means for rotatably supporting a plurality of rollers 9 between them, such means being in the form of bearings 11 of any suitable type in which the rollers may be journalled.

Also, at spaced locations longitudinally of the frame, there are affixed to the walls 3 and 5 a plurality of laterally extending depending brackets 13, with the brackets along one side of the frame being disposed opposite corresponding brackets along the other side of the frame. Such brackets contain bearings for rotatably supporting rollers 15 below the plane of the first mentioned rollers 9 and of greater longitudinal length than such first mentioned rollers.

The frame at one end is provided with a flared end section 17 made up of diverging walls 19, 21, the end section terminating at its extremity in a width sufficient to rotatably support a pulley 25 having a length comparable to those rollers 15 carried by the depending brackets.

The frame at its other end may similarly include a flaring end section 27 which includes, in addition to flaring walls 29, 31, parallel extensions 33 thereof, of greater depth. These parallel extensions are each formed with a slot 35 to provide for the slidable mounting of opposed bearings 37 in which to journal a pulley 39, whereby the position of such pulley may be slidably adjusted within the limits of such slots.

The frame carries a special flange forming belt 45, including a central load carrying portion 47 and marginal portions 49 bordering thereon and flexibly hinged thereto. The width of the load carrying portions approaches the spacing between the opposing flange supporting walls 3, 5 of the conveyor assembly for which it is intended, while the overall width of the belt in its flat condition is less than the length of the longer rollers 15 of such an assembly, which in the preferred form of the invention would correspond to the width of the trough formed by the stationary flange supporting walls 3 and 5 and the upper rollers 9, plus substantially the height of the two flange supporting walls.

A belt in accordance with the present invention may include one or more plies 53 corresponding in width to the overall width of the belt, and a cover compound 55 on the upper surface, while to the undersurface, one or more plies 57 are symmetrically disposed, corresponding in width to the load carrying portion of the belt. The resulting overhanging marginal portions 49 of the first-mentioned ply or plies 53 are thus flexibly hinged to the load carrying portion of the belt along hinge lines 58, and when in vertical or upstanding position, constitute integral flanges forming a unitary trough with the load carrying portions of the belt.

Such marginal flange forming portions of the belt, if too thin or too weak, might develop a tendency to double up when urged to an upright position, and to guard against such action, these marginal portions of the belt may be reinforced by one or more plies 59 which are separate and apart from and independent of the symmetrically included plies 57 backing up the load carrying portion of the belt.

In fabricating such belt, a strip of belting corresponding in width to the overall width desired and including the desired number of plies for the load carrying section thereof, is laid out on its cover layer with the bottom ply uppermost. In such position a narrow strip is removed along each hinge line to a desired depth, leaving at least one and perhaps more plies untouched adjacent the cover layer, and when so removed, the load carrying portion will be of the proper ply thickness and strength, while the marginal flange forming portions will be adequately reinforced against doubling up during use.

The belt will be installed in the conveyor frame by looping it about the rollers 9 and pulleys 25, 39 in the upper plane, and permitting the lower half of the belt to rest upon the longer rollers in the lower plane. Proper tension in the belt may be obtained by adjusting the end pulley 39.

By reason of the presence of the flange supporting walls, the belt will form a trough between such walls, with the load carrying portion of the belt resting on the rollers 9 while the marginal portions of the belt will be supported in upright flange position at an angle determined by the angle of the flange supporting walls. Due to the hinge construction of the belt, a very definite angular relationship will prevail between the load carrying portion of the belt and the marginal or flange portion thereof when disposed between these flange supporting walls.

On the other hand, the lower portion or lower half of the belt resting on the longer rollers in the lower plane will lie flat. The transition from this flat condition to the trough condition occurs as the belt passes around the end roller at the loading end of the conveyor assembly and during movement of the belt through the flared end section 17 of the assembly at the loading end, where the converging walls of this section will serve to guide the marginal portions of the belt to flange forming position by the time such marginal portions reach the flange supporting walls of the conveyor assembly.

At the unloading end of the conveyor assembly, the belt will naturally restore itself to a flat condition, when it emerges from between the parallel spaced flange supporting walls and approaches the pulley 39 at that end of the conveyor assembly. However, this end section of the conveyor assembly may include guide walls to govern such rate of restoration of the belt to its flat condition.

The self forming flange feature of applicant's conveyor assembly enables one to provide for complete or partial removal of the contents from the belt, at some intermediate location along the conveyor assembly. This can be realized in a very simple manner by providing a gap in one of the flange supporting walls, of a length such that the belt will have an opportunity to flatten out as it passes the gap, and by angularly disposing a baffle at such gap and in path of movement of all or part of the items on the belt, the baffle will cause such items as are intercepted thereby, to be diverted through the gap and off of the belt into a suitable receptacle disposed at that point, or on to a suitably located lateral belt.

By providing the belt with cross cleats 63 or other type of cleat structure across the load carrying portion of the belt, the marginal portions of the belt are still free to be raised and lowered, and when raised to flange forming position, will form a pocket belt which has many applications in the field of industry.

The belt may be protected against break-down attributable to continual flexing along the hinge line, by forming at least the overall width plies with transverse threads of nylon or other artificial fiber which possess great strength and resistance to continual flexing, while the longitudinal threads running through the ply may be of cotton or other fiber.

From the foregoing description of my invention in its preferred form, it will be apparent that the same is subject to alteration and modification without departing from the underlying principles involved, and while I have disclosed but one preferred embodiment of my invention, I do not desire to be limited in my protection to the specific details illustrated and described, except as may be necessitated by the appended claims.

I claim:

1. Flange forming belting adapted to flange to a 90 degree angle in a self forming flange belt conveyor assembly having a pair of parallel spaced flange supporting walls; comprising a single ply having a width substantially equal to the spacing of said walls plus the height of two flanges, said ply including a layer of duck having threads running longitudinally of the belting and threads of an artificial fibre of greater tensile strength and resiliency than such longitudinal threads, running transversely thereof for the full width of said belting and said ply constituting the top ply of said belting from side edge to side edge, and at least one ply of a width substantially equal to said spacing and symmetrically included in said belting below said first mentioned ply, to form with said first mentioned ply, an intermediate load carrying section and leaving overhanging marginal portions of said first mentioned top ply for the forming of flanges when installed as a component of such self forming flange belt conveyor, said transversely running artificial fibers across the hinge lines of said flanges absorbing the flexing stresses occasioned by the raising and lowering of said flanges and said duck in said ply rigidifying said flange against collapsing while being elevated to vertical flange position.

2. Flange forming belting adapted to flange to a 90 degree angle in a self forming flange belt conveyor assembly having a pair of parallel spaced flange supporting walls; comprising a single ply having a width substantially equal to the spacing of said walls plus the height of two flanges and terminating in free side edges, said ply including a layer of duck having cotton threads running longitudinally of the belting and threads of an artificial fibre such as nylon running transversely thereof for the full width of said belting and said ply constituting the top ply of said belting from side to side edge, a cover layer united to the upper side of said ply, and at least one ply of a width of substantially equal to said spacing and also terminating in free side edges, said last mentioned ply being symmetrically included in said belting below said first mentioned ply to form with said first mentioned ply, an intermediate load carrying section and leaving overhanging marginal portions of said first mentioned ply for the forming of flanges when installed as a component of such self forming flange belt conveyor, said transversely running nylon fibers across the hinge lines of said flanges absorbing the flexing stresses occasioned by merely raising and lowering of said flanges and said duck in said ply rigidifying said flanges against collapsing while being elevated to said vertical flange position.

3. Flange forming belting adapted to flange to a 90 degree angle in a self forming flange belt conveyor assembly having a pair of parallel spaced flange supporting walls; comprising a single ply having a width substantially equal to the spacing of said walls plus the height of two flanges and terminating in free side edges, said ply including a layer of duck having cotton threads running longitudinally of the belting and said ply constituting the top ply of said belting from side edge to side edge and threads of artificial fibre of greater tensile strength and resiliency than similar threads of cotton, running transversely thereof for the full width of said belting, a cover layer united to the upper side of said ply, and at least one ply of a width substantially equal to said spacing and also terminating in free side edges, said last mentioned ply being symmetrically included in said belting below said first mentioned ply, to form with said first mentioned ply, an intermediate load carrying section and leaving overhanging marginal portions of said first mentioned ply for the forming of flanges when installed as a component of such self forming flange belt conveyor, said transversely running artificial fibers across the hinge lines of said flanges absorbing the flexing stresses occasioned by the raising and lowering of said flanges and said duck in said ply rigidifying said flanges against collapsing while being elevated to vertical flange position, and means reinforcing each of said marginal portions, said means including at least one ply independent of said second mentioned ply and backing up said marginal portion to further rigidify each such flange against collapsing while being thus elevated, said flange reinforcing plies also terminating in free side edges.

4. Flange forming belting adapted to flange to a 90 degree angle in a self forming flange belt conveyor assembly having a pair of parallel spaced flange supporting walls; comprising a single ply of uniform material throughout its width; and having a width substantially equal to the spacing of said walls plus the height of two flanges and terminating in exposed ply edges, said ply constituting the top ply of said belting from side edge to side edge, a cover layer united to the upper side of said ply, and at least one ply of a width substantially equal to said spacing and symmetrically included in said belting below said first mentioned ply, to form with said first mentioned ply an intermediate load carrying section and leaving overhanging marginal portions of said first mentioned ply for the forming of flanges when installed as a component of such self forming flange belt conveyor, and means reinforcing each of said marginal portions, said means including at least one ply independent of said second mentioned ply and backing up said marginal portion, with both said second mentioned ply and said reinforcing plies also terminating in exposed ply edges.

5. Flange forming belting adapted to flange to a 90 degree angle in a self forming flange belt conveyor assembly, comprising a single full width ply having longitudinal threads of low tensile strength and resiliency of the order of that of cotton as compared to threads of artificial fibres such as nylon, such full width ply having a cover layer united to the upper surface thereof, at least one ply included in said belting beneath said single full width ply and to either side of a desired hinge line of said flange forming belting, and a plurality of threads of artificial fibre such as nylon, in said single full width ply and spanning said hinge line.

References Cited in the file of this patent

UNITED STATES PATENTS

| | | |
|---|---|---|
| 507,156 | Niedergesaess | Oct. 24, 1893 |
| 722,040 | Plummer | Mar. 3, 1903 |
| 2,094,728 | Tinsley | Oct. 5, 1937 |
| 2,856,065 | De Windt | Oct. 14, 1958 |

FOREIGN PATENTS

| | | |
|---|---|---|
| 800,705 | France | May 11, 1936 |
| 836,621 | Germany | Apr. 15, 1952 |